(12) United States Patent
Seo et al.

(10) Patent No.: US 10,129,898 B2
(45) Date of Patent: Nov. 13, 2018

(54) METHOD FOR DETERMINING RESOURCE FOR DEVICE-TO-DEVICE (D2D) COMMUNICATION IN WIRELESS COMMUNICATION SYSTEM AND APPARATUS THEREFOR

(71) Applicant: LG ELECTRONICS INC., Seoul (KR)

(72) Inventors: Hanbyul Seo, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 15/308,820

(22) PCT Filed: Jun. 22, 2015

(86) PCT No.: PCT/KR2015/006288
§ 371 (c)(1),
(2) Date: Nov. 3, 2016

(87) PCT Pub. No.: WO2015/194916
PCT Pub. Date: Dec. 23, 2015

(65) Prior Publication Data
US 2017/0188375 A1  Jun. 29, 2017

Related U.S. Application Data

(60) Provisional application No. 62/014,705, filed on Jun. 20, 2014.

(51) Int. Cl.
*H04L 12/26* (2006.01)
*H04W 72/08* (2009.01)
*H04W 88/02* (2009.01)

(52) U.S. Cl.
CPC .......... *H04W 72/085* (2013.01); *H04W 88/02* (2013.01)

(58) Field of Classification Search
USPC ....... 370/229, 230, 235, 236, 252, 328, 329, 370/330
See application file for complete search history.

(56) References Cited

U.S. PATENT DOCUMENTS

| | | | |
|---|---|---|---|
| 9,826,539 B2 * | 11/2017 | Chatterjee | H04W 72/10 |
| 2013/0308551 A1 | 11/2013 | Madan et al. | |
| 2014/0094183 A1 | 4/2014 | Gao et al. | |
| 2015/0327240 A1 * | 11/2015 | Yamada | H04W 72/02 455/426.1 |

(Continued)

OTHER PUBLICATIONS

PCT International Application No. PCT/KR2015/006288, Written Opinion of the International Searching Authority dated Oct. 2, 2015, 18 pages.

(Continued)

*Primary Examiner* — Kwang B Yao
*Assistant Examiner* — Nguyen Ngo
(74) *Attorney, Agent, or Firm* — Lee, Hong, Degerman, Kang & Walmey

(57) ABSTRACT

The present invention relates to a wireless communication system, and a method for determining a resource for device-to-device communication by a user equipment is disclosed. A method for determining a resource for device-to-device communication according to an embodiment of the present invention may comprise the steps of: receiving, from an eNode B (eNB), configuration information related to a resource pool configured for each level; selecting the resource pool of the device-to-device communication on the basis of the configuration information; and selecting a resource for the device-to-device communication in the resource pool. Herein, the resource pool may be configured to have two or more levels.

10 Claims, 10 Drawing Sheets

(56) References Cited

U.S. PATENT DOCUMENTS

| | | | | |
|---|---|---|---|---|
| 2015/0327311 A1* | 11/2015 | Wei | ................ | H04L 12/6418 370/329 |
| 2016/0014632 A1* | 1/2016 | Siow | ................ | H04L 5/0085 370/230 |
| 2016/0242152 A1* | 8/2016 | Yu | ................ | H04W 8/005 |
| 2016/0302215 A1* | 10/2016 | Sorrentino | ................ | H04W 76/023 |
| 2017/0006585 A1* | 1/2017 | Jung | ................ | H04W 72/042 |
| 2017/0034687 A1* | 2/2017 | Yu | ................ | H04W 8/005 |
| 2017/0063595 A1* | 3/2017 | Ma | ................ | H04L 29/08 |
| 2017/0105204 A1* | 4/2017 | Zhang | ................ | H04W 72/042 |
| 2017/0353848 A1* | 12/2017 | He | ................ | H04L 5/0069 |

OTHER PUBLICATIONS

Ericsson, "Resource allocation mode selection", R2-142398, 3GPP TSG-RAN WG2 #86, May 9, 2014, 5 pages.

LG Electronics, "Discussion on Signaling for D2D Communication Resource Allocation," R1-142147, 3GPP TSG RAN WG1 Meeting #77, May 10, 2014, 8 pages.

Asustek, "Discussion of mode 2 resource allocation for D2D communication," R1-142358, 3GPP TSG RAN WG1 Meeting #77, May 10, 2014, 3 pages.

European Patent Office Application Serial No. 15809673.5, Search Report dated Jan. 23, 2018, 7 pages.

Eads, "Radio resource sharing between Public Safety groups using D2D", 3GPP TSG RAN WG1 Meeting #76, R1-140516, Feb. 2014, 4 pages.

Sony, "D2D Resource Allocation Mode Selection", 3GPP TSG RAN WG2 Meeting #85bis, R2-141300, Apr. 2014, 4 pages.

* cited by examiner

FIG. 2
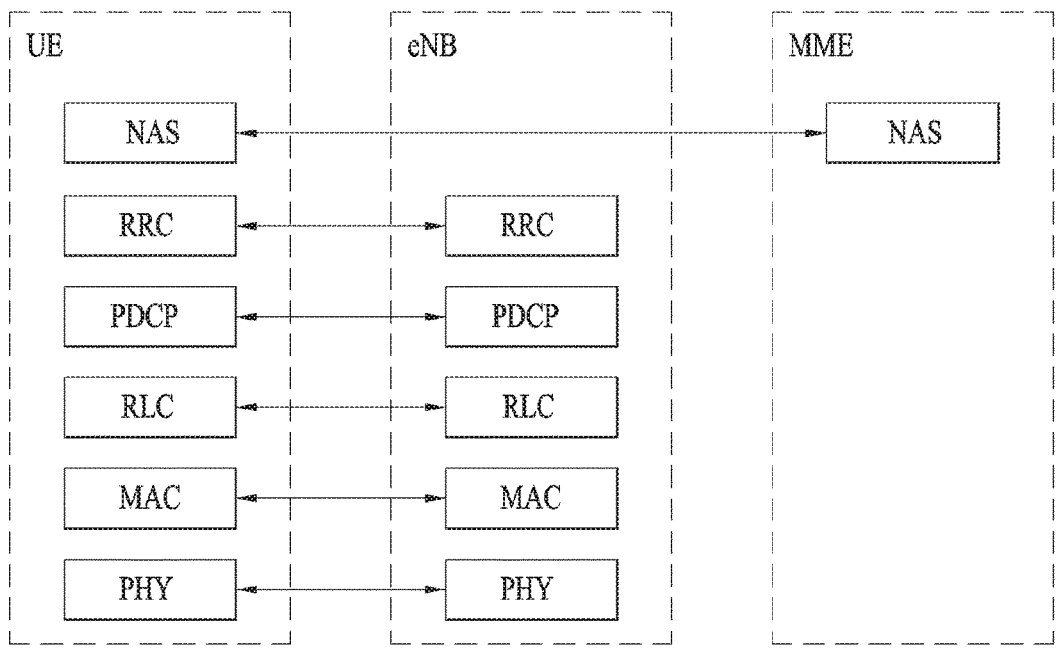
(a) Control-plane protocol stack
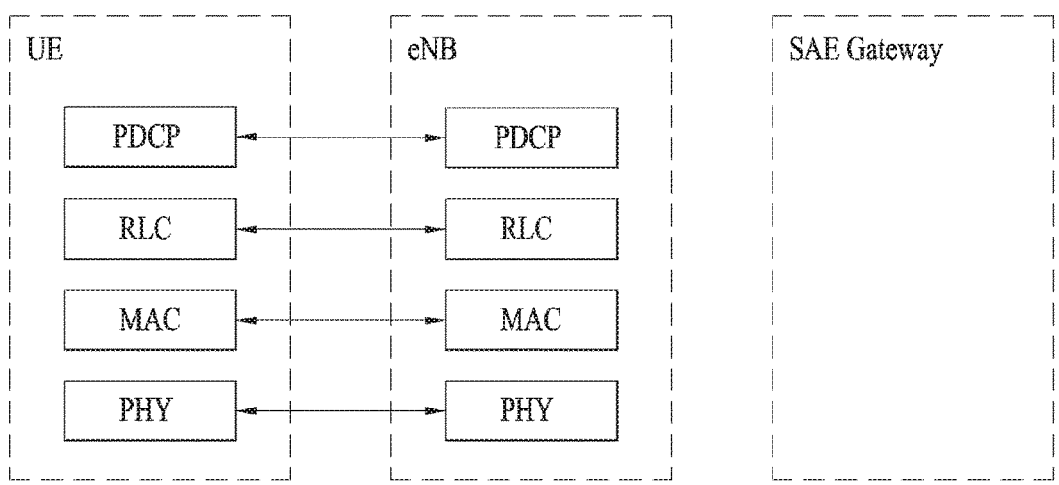
(b) User-plane protocol stack

METHOD FOR DETERMINING RESOURCE FOR DEVICE-TO-DEVICE (D2D) COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/006288, filed on Jun. 22, 2015, which claims the benefit of U.S. Provisional Application No. 62/014,705, filed on Jun. 20, 2014, the contents of which are all hereby incorporated by reference herein in their entirety.

TECHNICAL FIELD

The present invention relates to a wireless communication system, and a more particularly, to a method and apparatus for determining a resource for device-to-device (D2D) communication in a wireless communication system.

BACKGROUND ART

A structure of a 3GPP LTE (3rd Generation Partnership Project Long Term Evolution; hereinafter, referred as "LTE") system which is an example of a wireless communication system to which the present invention may be applied will be described.

FIG. 1 illustrates a schematic structure a network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

DISCLOSURE

Technical Problem

An object of the present invention devised to solve the problem lies in a method and apparatus for determining a resource for device-to-device (D2D) communication in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method of determining a resource for device-to-device (D2D) communication in a wireless communication system, the method including receiving configuration information on a resource pool configured for each level from a base station (BS), selecting a resource pool of D2D communication based on the configuration information, and selecting a resource of D2D communication in the resource pool. Here, the resource pool may be configured in at least two levels.

In another aspect of the present invention, provided herein is a user equipment (UE) for receiving a synchronization signal, the UE including a transceiver for transmitting and receiving a signal to and from a base station (BS) or a counterpart UE of D2D communication, and a processor for processing the signal, wherein the processor is configured to receive configuration information on a resource pool configured for each level from a base station (BS), to select a resource pool of D2D communication based on the configuration information, and to select a resource of D2D communication in the resource pool and the resource pool is configured in at least two levels.

The following features may be commonly applied to the aforementioned embodiment.

The method may further include transmitting a signal to counterpart user equipment (UE) of D2D communication using the selected resource.

The selecting of the resource of D2D communication may include determining a level to be used in D2D communication.

The level to be used in D2D communication may be determined based on load of D2D communication.

In detail, the specific level is selected as a level to be used in D2D communication when load of D2D communication is equal to or greater than threshold load for a specific level and is less than threshold load of a higher level of the specific level.

The level to be used in D2D communication may be determined based on importance of a signal of D2D communication.

When the level is determined as n+1, the selected resource pool may include a resource pool for level (n+1). Furthermore, the selected resource pool may include a resource pool for level n.

The configuration information may indicate a resource for each level, and a resource for each level may be a resource added from a resource for a low level.

The selecting of the resource pool may be performed at a predetermined period.

The method may further include transmitting information on the selected level to a BS by the UE. The method may further include receiving scheduling information based on information on the selected level. Here, a resource corresponding to the remaining resource pool except for a resource pool of a selected level from the resource pool configured for each level is allocated for a signal with the BS.

It is to be understood that both the foregoing general description and the following detailed description of the present invention are exemplary and explanatory and are intended to provide further explanation of the invention as claimed.

Advantageous Effects

According to the present invention, a resource for device-to-device (D2D) communication in a wireless communication system may be effectively determined.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating a control plane and a user plane of a radio interface protocol between user equipment (UE) and E-UTRAN based on the 3GPP wireless access network standard;

BEST MODE

Figure 1:
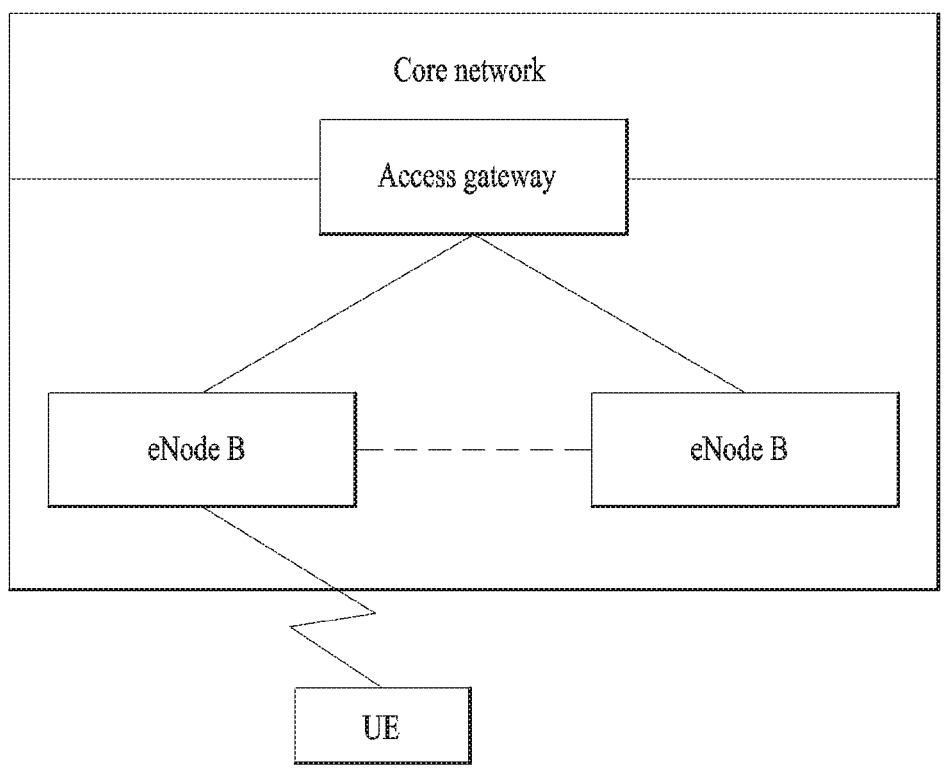
FIG. 1 is a diagram illustrating a structure of an E-UMTS network as an example of a wireless communication system.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
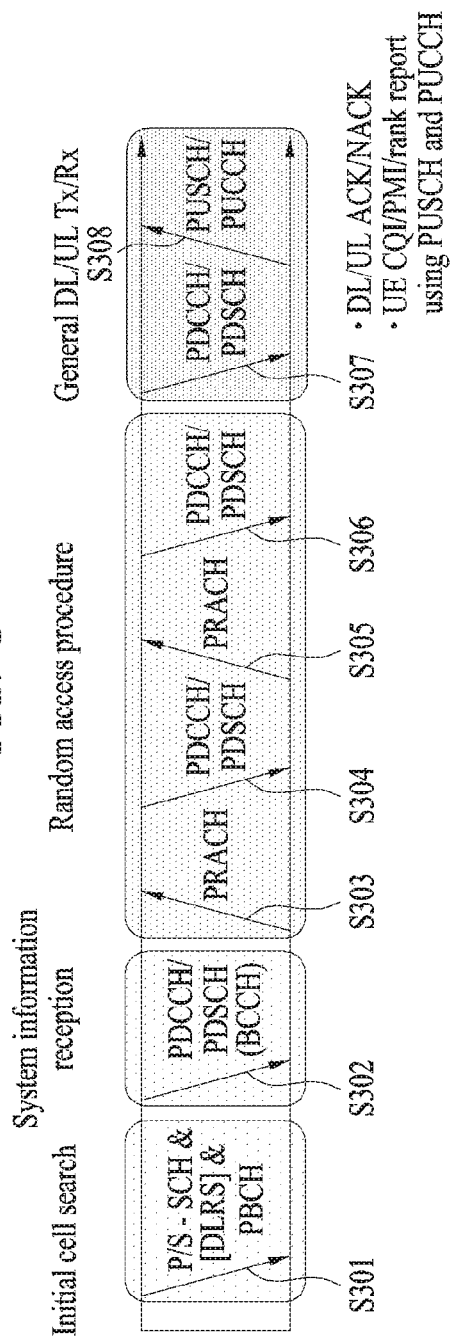
FIG. 3 is a diagram illustrating physical channels used in a 3GPP LTE system and a general method of transmitting a signal using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
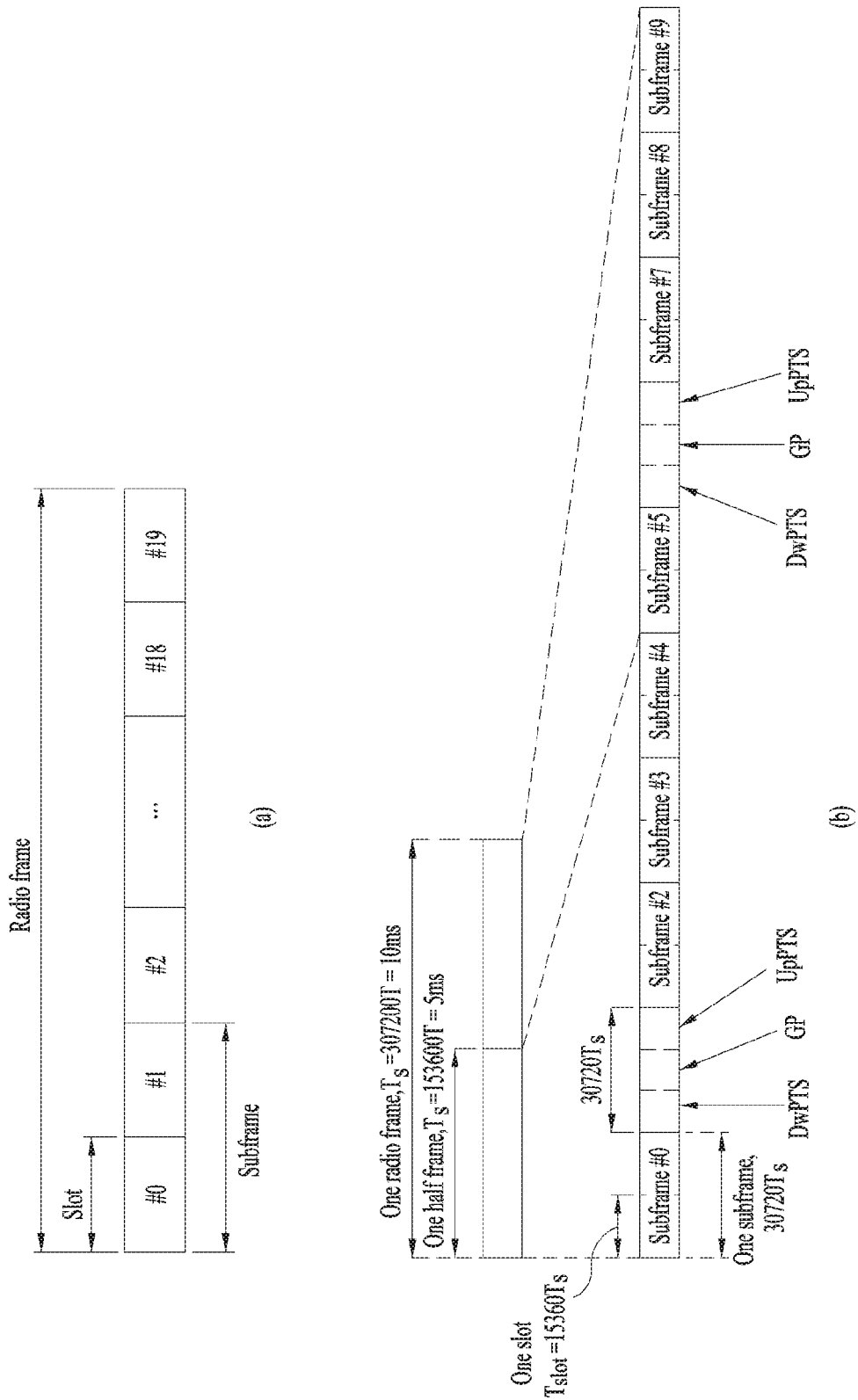
FIG. 4 is a diagram illustrating a structure of a radio frame used in a LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols.

When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

In Table 1, D denotes a downlink subframe, U denotes an uplink subframe, and S denotes the special subframe. Table 1 also shows downlink-to-uplink switch-point periodicity in uplink/downlink subframe configuration of each system.

The structure of the above radio frame is just example. The number of a subframe, the number of slot included in a subframe or the number of symbol included in a slot included in the radio frame can be changed.

Figure 5:
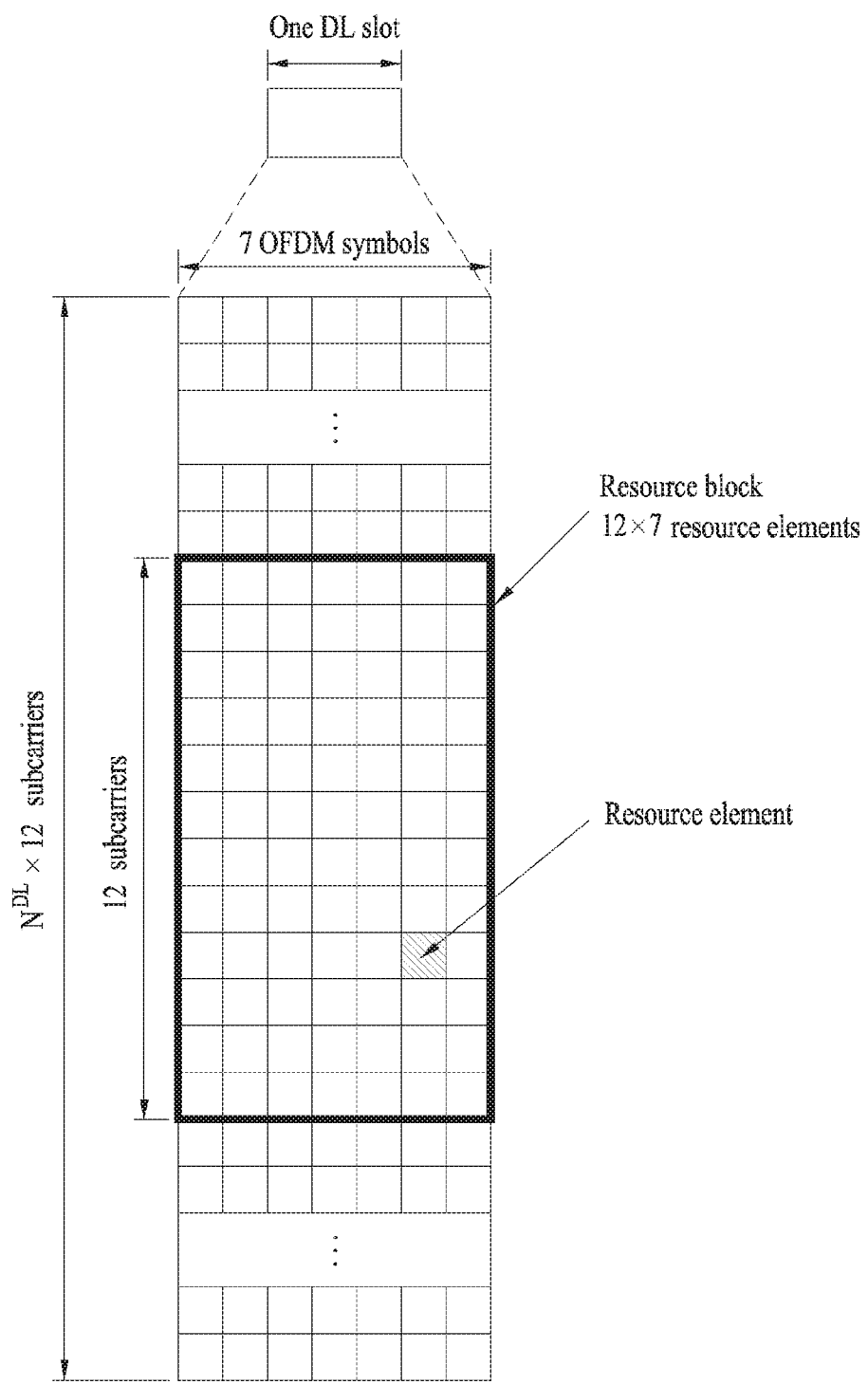
FIG. 5 is a diagram illustrating resource grid for downlink slot.

FIG. 5 is a diagram illustrating a resource grid for a downlink slot.

Referring to FIG. 5, a DL slot includes OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | Normal | Extended |
| Special subframe configuration | DwPTS | cyclic prefix in uplink | cyclic prefix in uplink | DwPTS | cyclic prefix in uplink | cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 6:
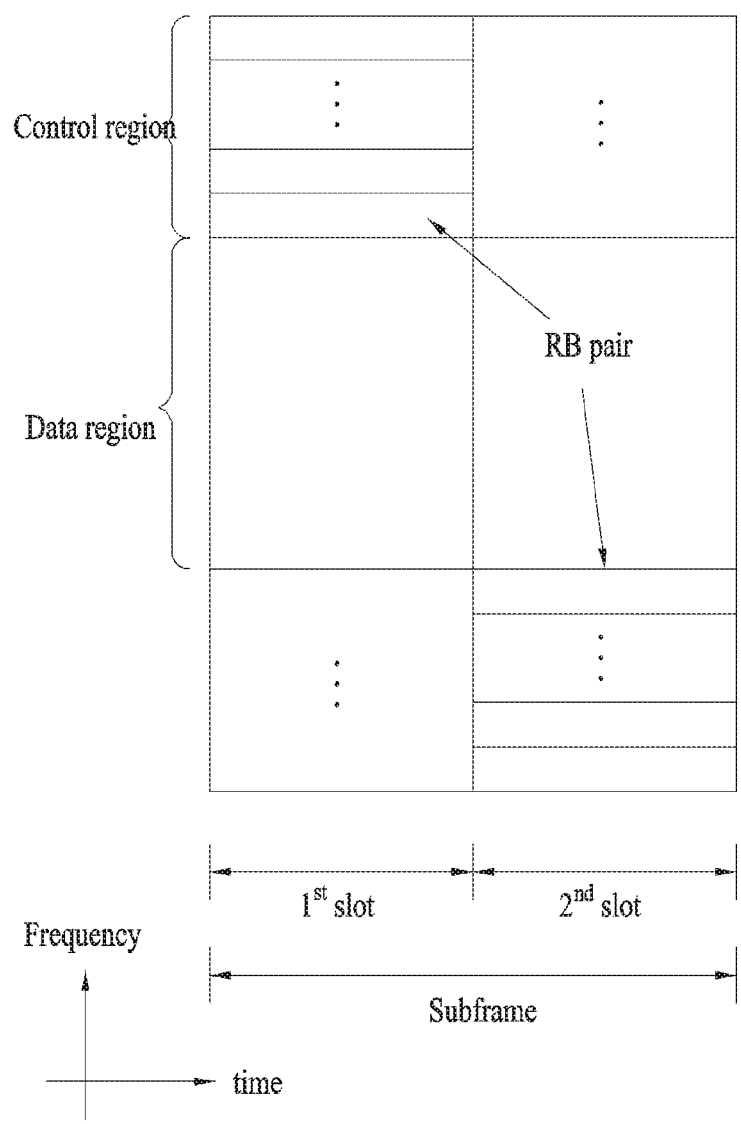
FIG. 6 is a diagram illustrating a structure of an uplink subframe.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
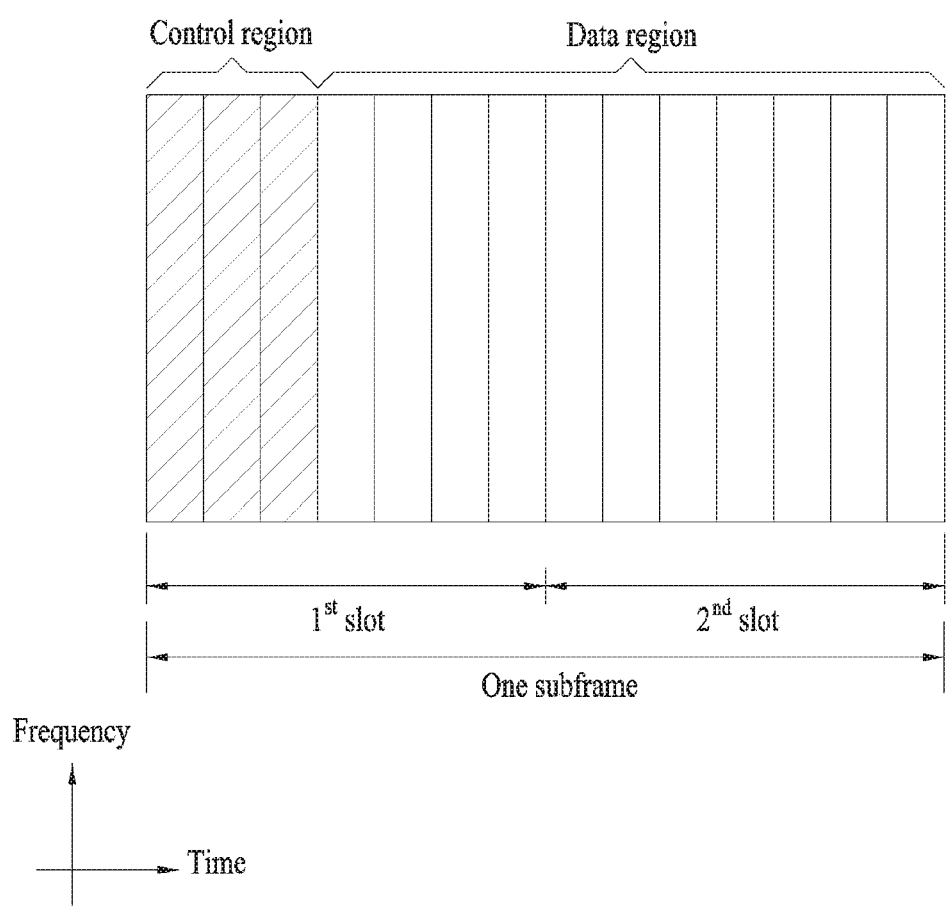
FIG. 7 is a diagram illustrating a structure of a downlink subframe used in LTE.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PC-FICH), a physical downlink control channel (PDCCH), a physical hybrid ARQ indicator channel (PHICH), etc.

The Physical Control Format Indicator Channel (PC-FICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The RE indicates minimum physical resource defined as one sub-carrier×one OFDM symbol. The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Device to Device (D2D) Communication

When D2D communication is applied to the aforementioned wireless communication system (e.g., 3GPP LTE system or 3GPP LTE-A system), a detailed method for performing D2D communication will be described below.

Hereinafter, a communication environment between devices according to the present invention will be described briefly.

D2D communication literally refers to communication between electronic devices. In a broad sense, D2D communication refers to wired or wireless communication between electronic devices or communication between a machine and a device controlled by the human. Recently, in general, D2D communication refers to wireless communication between electronic devices, which is performed irrespective of the human.

Figure 8:
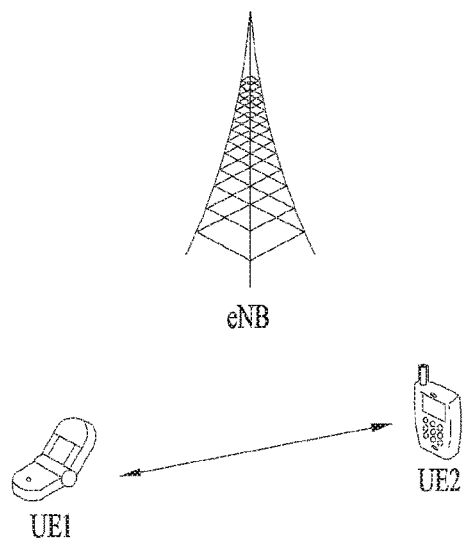
FIG. 8 is a diagram illustrating a communication system applicable to the present invention.

FIG. 8 is a diagram for explanation of a concept of D2D communication. FIG. 8 illustrates D2D or UE-to-UE communication method as an example of D2D communication and data exchange between UEs may be performed without passing through an eNB. As such, link that is directly established between devices may be referred to as a D2D link or a side link. D2D communication advantageously has low latency and requires a small amount of radio resources compared with a conventional eNB-centered communication method. Here, the UE refers to a user terminal but may be considered as a kind of UE when network equipment such as an eNB transmits and receives a signal according to a communication method between UEs. Hereinafter, a link that is directly connected between UEs will be referred to as a D2D link and a link through which a UE communicates with an eNB will be referred to as an NU link.

A method of determining a resource for transmitting a D2D signal by a UE will be described. In general, there are two methods of determining a resource to be used to transmit a D2D signal by a UE. One of the methods is a method of determining an appropriate resource by a transmission UE itself in a resource pool determined by an eNB (hereinafter, UE autonomous selection) and the other one is a method of determining a resource to be used directly to a separate transmission UE via UE-specific signaling by an eNB (hereinafter, eNB allocation). As an example of eNB allocation, an eNB may transmit a resource allocation signal to a UE through a PDCCH and the UE that receives the resource allocation may transmit a D2D signal using the resource determined by the eNB.

The eNB allocation method may advantageously determine a resource appropriate for a separate UE to enhance resource utilization by an eNB but may disadvantageously cause predetermined time delay in D2D signal transmission according to a pre-signaling procedure of requesting resource allocation to an eNB by a UE and transmitting a resource allocation signal according to the request. On the other hand, since the autonomous selection method does not require a separate signal exchange procedure with an eNB, rapid D2D signal transmission is possible, but a resource is selected without adjustment between different UEs and, accordingly, there is the possibility of resource collision in which two adjacent transmission UEs select the same resource to degrade communication performance.

D2D communication is appropriate to be used as a communication method, particularly, in an emergency situation, but the autonomous selection method has the feature of a very short time until signal transmission is initiated and, thus, is more appropriate to be used as a communication method in an emergency situation. However, the possibility that a plurality of transmission UEs simultaneously attempt signal transmission according to an emergency situation is high in an emergency situation and, in this case, when a resource pool configured by an eNB has not a sufficient size, there is the possibility that resource collision frequently occurs and an effect of the resource pool is degraded.

Hereinafter, resource configuration for effective D2D communication will be described with regard to diverse embodiments of the present invention.

Embodiment 1

There is a method of pre-configuring a resource pool with a very large size when a resource for effective D2D communication is configured in the autonomous selection method. However, when a resource pool is pre-configured to have a sufficient large size, resource efficiency at normal time is disadvantageously degraded due to excessive resource allocation. Accordingly, hereinafter, a method of effectively allocating resources in order to reduce the possibility of recourse collision while reducing a time until signal transmission is initiated in an emergency situation using the autonomous selection method will be proposed.

Hereinafter, a method of effectively adjusting a resource pool via stepwise configuration in a situation in which the autonomous selection method is used will be described with regard to diverse embodiments of the present invention.

Embodiment 2

Hereinafter, a method of stepwise configuration of a resource pool to be applied to the following various embodiments of the present invention will be described. In the present invention, a resource pool may be configured in such a way that a higher level (or step) of a resource pool is used when D2D traffic load is increased. Here, the resource pool may be configured in such a way that a high level of resource pool has much time or frequency resource compared with a low level of resource pool.

Embodiment 2-1

According to Embodiment 2-1, as an example of multi-level resource configuration, a high level of resource pool may be indicated to always include a low level of resource pool. In this case, the multi-level resource configuration may be the form of first configuring of level 1 of a resource and then additionally configuring a resource included in a resource pool when level 2 of resource as a next higher level is used. That is, a procedure of determining a resource to be additionally used by a next higher level of a resource pool may be sequentially performed to a level N.

Figure 9:
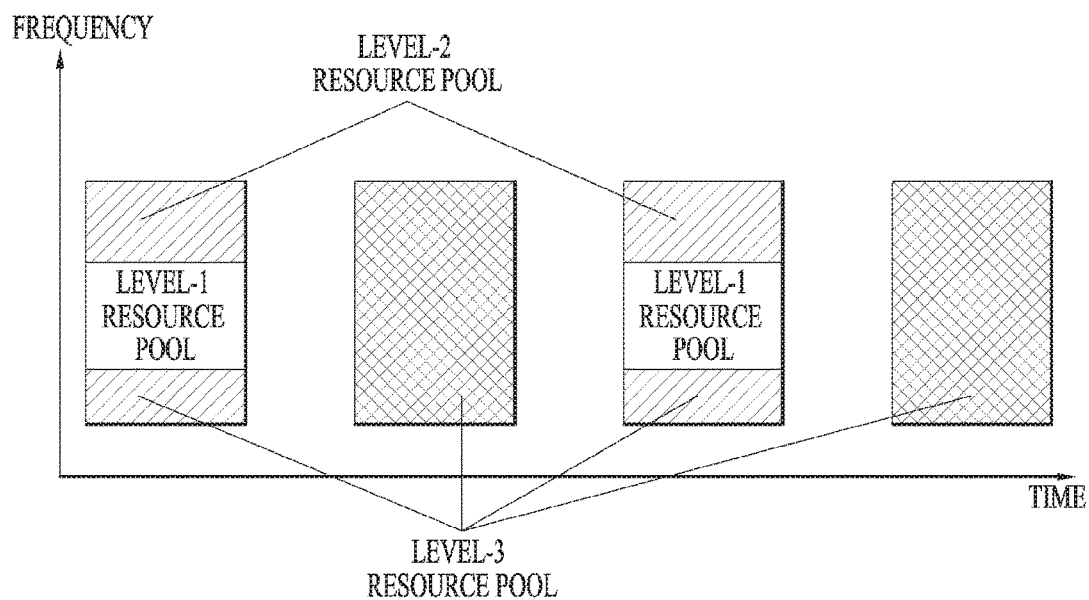
FIG. 9 is a diagram illustrating an example of stepwise configuring of resources according to the present invention.

Hereinafter, a method of configuring a resource pool will be described with reference to FIG. 9. FIG. 9 illustrates an example of configuration of a resource pool in the case of N=3 where N is the number of configured levels. The description given here may be applied in the same way to the following embodiments. Here, the resource pool may be designed in such a way that level 2 uses the same time resource as level 1 and uses more frequency resource including level 1 of a resource. In addition, this corresponds to the case in which level 3 further uses another time resource by further reducing a period of a resource pool.

When use of level 2 of a resource pool of is determined, a UE may select a resource for D2D communication in a resource pool corresponding to level 2. Here, conventionally, when a resource pool corresponding to level 1, a resource may be selected in further consideration of a resource that is further included in level 2 in addition to level 1 of a resource. When use of level 2 is determined from an initial step, a resource for D2D communication is selected in a resource pool that further includes a resource determined for level 2 in addition to a resource determined for level 1.

In this case, referring to FIG. 9, level 1 of a resource is included in level 2 of a resource pool and, thus, a resource corresponding to level 1 may also be used.

Referring to FIG. 9, a resource pool may be configured for each of level 1, level 2, and level 3. Each level may be configured to have a resource pool including more resources than a lower level thereof and FIG. 9 illustrates only the case of N=3 but the present invention is not limited thereto. In addition, a resource added in each level may be designed with respect to the same frequency, different times, different frequencies, or different time resources.

Embodiment 2-2

As another example of multi-level resource configuration, a high level of resource pool may be indicated to always include a low level of resource pool. In this case, the multi-level resource configuration may be the form in that a resource added in each level is not configured and a resource to be used in a corresponding level is configured. That is, in FIG. 9, when level 2 of a resource pool as a next higher level is configured, the resource pool may be configured to a resource including level 1 but not a resource except for level 1.

For example, when an eNB makes a request for use of level 2 of a resource pool to the UE due to increase in load while the UE selects a resource in level 1 of a resource pool, the UE may select a resource in a resource pool configured in level 2. In this case, as illustrated in FIG. 9, level 2 of a resource pool include level 1 of a resource pool and, thus, a resource pool as a range for selecting a resource by a UE may be the same as in the case of Embodiment 2-1. However, when resource configuration for each step is given for different frequencies or time region unlike in FIG. 9, a resource pool configured in level 2 may not necessarily include a resource pool configured in level 1.

According to the aforementioned Embodiment 2, a multi-level D2D resource pool configuration method of stepwise configuration of a resource pool to be used according to load of D2D traffic may be used. In detail, a network may configure a total of N D2D resource pools and pre-make a request for use of an nth resource pool in level n by a UE to a D2D UE. When a resource pool to be used is determined, D2D UEs in a corresponding resource may transmit and receive a D2D signal based on the autonomous selection method.

Hereinafter, a detailed method of determining a resource pool configured in a multi-level will be described with regard to diverse embodiments of the present invention. The description of the multi-level resource configuration described in Embodiment 2 above may be applied to the following embodiments.

Embodiment 3

Whether, when, and which level of resource is to be used next time may be determined by a UE or a network. In Embodiment 3, a method of indicating a resource pool, which is to be used by a UE, by a network will be described below.

According to Embodiment 3, an eNB may recognize current D2D load and configure a resource pool appropriate for the load. In detail, the eNB may recognize a signal strength or resource utilization in a D2D resource pool that is currently and directly used and operate to enhance a level (or step) upon determining that excessively many resources are used and to lower a level upon determining that excessively many resources are empty. In this case, the eNB may recognize D2D load and configures a resource pool and, thus, the eNB needs to notify the UE about a used resource pool. Hereinafter, a method of notifying a UE of a level of a resource pool to be used will be described. The eNB may recognize D2D load at a predetermined period, configure a resource pool appropriate for the D2D load, and notify the UE of the configured resource pool.

A level of a resource pool to be used needs to be broadcast to all UEs. In this case, a high layer signal such as SIB may be used but this may not be appropriate in that the signaling latency is increased. As another method, a physical layer signal such as a PDCCH may also be used. For example, in a common search space in which all UEs perform monitoring, downlink control information (DCI) containing a field for configuring a level of a resource pool to be used may be transmitted and received and may be CRC-masked by a separate RNTI for differentiation from another DCI. As another method, a specific PDSCH may be scheduled through DCI that is CRC masked with RNTI differentiated from all other DCIs and a level to be used from a current time point and related resource pool information may be transmitted through the corresponding PDSCH.

It may be difficult to recognize accurate load of D2D by an eNB and, thus, UEs may report the accurate load. The UE may measure and report resource strength or resource utilization in a D2D resource pool so as to help an eNB configure an appropriate level. A detailed method of measurement of D2D load will be described below.

The aforementioned eNB signaling based resource pool level configuring method may not be appropriate for an emergency D2D signal transmitting situation due to signaling latency. In this case, the following method of configuring a level by a UE itself may be more appropriate.

Embodiment 4

Hereinafter, a method of determining a level of a resource to be used, by a UE itself will be described.

According to Embodiment 4, a UE may operate to measure traffic load and to determine a resource pool to be used. The UE may first measure D2D traffic load in a D2D resource pool in each level. When the D2D traffic load measured with respect to level n is a predetermined level or more, the corresponding UE may operate to use level (n+1) of a resource pool without separate permission of an eNB. Here, a level of D2D traffic load for each level may be appropriately configured. Here, the traffic load may be measured at a predetermined period. Similarly, a level of a resource pool to be used may be periodically determined in consideration of the traffic load.

However, a UE that begins to use level (n+1) may be determined to report information indicating that an eNB begins to use level (n+1) within a predetermined time period using, for example, uplink grant that is first allocated by the eNB. That is, the report may be performed in the form of post report. In order to as rapidly perform the report as possible, the corresponding UE may transmit a scheduling request (SR) or attempt random access within a predetermined time period from a time point when level (n+1) is used, for example, at a first given opportunity, and the eNB may transmit uplink grant for report. The eNB based on the report may recognize a level of a D2D resource pool that is currently used and use a resource based on the recognized situation. For example, the eNB may operate to use other resources except for a currently used level of a D2D resource pool in communication (e.g., WAN communication) with the UE. In addition, when traffic load of level (n+1) is a predetermined level or less, the UE that has used level (n+1) may not use level (n+1) any longer and may be determined to use level n.

For the aforementioned operation, each UE needs to appropriately measure D2D traffic load in each level of a D2D resource pool. In this case, it may be effective to measure DM RS of D2D.

In general, in order to differentiate D2D and a UL signal to an eNB and to randomize interference therebetween, D2D may use a sequence that is not used in the UL signal to an eNB as DM RS. Accordingly, each UE may blind-detect a DM RS sequence of D2D in a each level of a resource pool and recognize whether D2D transmission is performed by a corresponding D2D resource unit according to the detection result.

In detail, D2D traffic load may be indicated as an average of D2D DM RS receiving power measured by each D2D resource unit in a corresponding level. Alternatively, when the D2D DM RS receiving power is a predetermined level or more and the corresponding D2D resource unit is determined to be actually used via D2D, resource utilization indicated in the form of a ratio of the D2D resource unit that is used from each level of a resource pool may be used as a parameter indicating the D2D traffic load.

In this case, the eNB may indicate a D2D resource in which traffic load is to be measured to the UE. In this regard, the indicting operation may be effective to guide for measurement and adaptation of load of D2D that is not controlled directly by the eNB, in particular, when the eNB directly controls some of all D2D resources through an eNB allocation method.

When the eNB schedules signal transmission (e.g., WAN signal transmission) other than D2D, it may be helpful to use a level of a D2D resource pool. First, it may be obvious that there is no D2D transmission for a resource that is not included in level n of a D2D resource pool and, thus, the eNB may preferentially use the corresponding resource in UL signal transmission of the UE.

Nevertheless, when resources are insufficient, a resource included in the D2D resource pool needs to be used. In this regard, time/frequency resources included only in a high level of a resource pool is used only in high D2D load and, thus, the possibility that the time/frequency resources are used in actual D2D may be predicted to be lower than a resource that is also included in a low level of a resource pool. Accordingly, the eNB may preferentially use a resource included only in a high level of a resource pool so as to lower the possibility of collision with D2D operating using, in particular, the autonomous selection method compared with a case in which an arbitrary resource is used. This may be applied in the same way to Embodiment 3 above.

Embodiment 5

A D2D signal transmitted by a UE may be classified into a signal including various control information items (hereinafter, scheduling assignment (SA)) for subsequent D2D data transmission and a signal (hereinafter, D2D data) for transmitting user data according to control information transmitted by an SA. A reception UE may operate to blind-detect the SA and then to receive D2D data according to control information included in the SA. The control information included in the SA may contain time/frequency resources occupied by data signals at the same time or thereafter, a modulation and coding scheme (MCS) of the data signal, ID information of a UE as a reception target of the data signal, and so on. According to this order, the SA resource pool may be differentiated from the D2D data resource pool and, in this case, the aforementioned method of applying multi-level resource pool configuration will be described. The aforementioned method of applying multi-level resource pool configuration may be applied in the same way to the following embodiments.

Embodiment 5-1

First, both an SA resource pool and a D2D data resource pool may be classified into a plurality of levels. That is, when level n is used, SA may be transmitted using level n of an SA resource pool and, accordingly, D2D data may be transmitted using the level n of D2D data resource pool.

In this case, D2D traffic load measured by the UE, in particular, through DM RS of D2D may be limited to an SA resource pool. This is because, in the case of SA, a DM RS sequence is pre-fixed in order to easily blindly receive data by all UEs, whereas in the case of D2D data, there is the possibility that a DM RS sequence is changed according to control information in the SA. In this case, based on the measurement result of the SA, a resource pool of the SA and/or a resource pool of the D2D data may be determined.

When this principle is applied, the UE may measure load in each level of an SA resource pool and determine an appropriate level of resource pool or report the load to the eNB and the eNB that receives the report may determine a level in consideration of the measured load so as to simplify measurement of D2D traffic load of the UE.

Embodiment 5-2

As another method, when only one resource pool used irrespective of a level is present as an SA resource pool, a D2D data resource pool may be designed to have various levels. The SA is intermittently transmitted and control information for transmission of a plurality of D2D data transmission is transmitted via one time transmission and, thus, this method may be effective in the case of a limited gain to be obtained by managing an SA resource pool itself in a plurality of levels due to a relatively small amount of resources used by an SA resource pool. In this case, when D2D traffic load is measured in a common SA resource pool irrespective of a level, the aforementioned operation may be slightly modified.

For example, the eNB may configure a reference (hereinafter, $th_{load\_n}$) of D2D traffic load corresponding to level n of D2D data resource pool, and when D2D load measured in the SA resource pool is equal to or greater than $th_{load\_n}$ and is less than $th_{load\_n+1}$, the UE may be determined to use level n of a D2D data resource pool. Needless to say, it may be possible to always to use level 1 as a lowermost level and, thus, $th_{load\_1}$ may be configured to 0. The description of level determination may also be applied to Embodiments 2 to 4 above.

When level n of a D2D data resource pool is used, the UE may select an arbitrary resource that transmits SA from a common SA resource pool but, in the case of D2D transmitted based on the SA, the UE needs to operate so as to resource belonging to level n of a D2D data resource pool.

According to Embodiments 2 to 5, when a specific UE uses level η, another UE needs to also recognize level η. In particular, this is obvious in that other UEs initiate to monitor level η of a resource pool. For example, a UE that initiates to use level η may indicate that a corresponding UE uses level η through a predetermined specific signal (e.g., D2D synchronization signal (D2DSS) or D2D synchronization channel used in synchronization of D2D). When time latency in the case of provision of signaling needs to be reduced, all UEs may be determined to always attempt to receive all levels of a resource pool.

Embodiment 6

A resource pool to be used by a transmission UE may be divided according to a class of a D2D signal but not load. According to Embodiment 6, a method of determining a resource pool according to a class of a D2D signal will be described. Here, the class of the D2D signal may be determined according to delay requirement or emergency of a D2D signal, reliability requirement, or the like and may refer to emergency or importance of a signal.

For example, a D2D signal may belong to one of K classes and a D2D signal belonging to class k may use resource pool k. Here, all resources are assumed to be divided into K resource pools.

In order to perform the aforementioned operation according to D2D load in this situation, a resource pool corresponding to each class may be re-divided into a plurality of levels. That is, resource pool k of class k may be additionally divided into $N_k$ levels using the aforementioned method. Thus, the number of all resource pools may be $N_1+N_2+\ldots+N_K$ ($1<k<K$) or $N_0+N_1+\ldots+N_{K-1}$ ($0<k<K-1$) and, in this case, the number of levels divided from each class of a resource pool may be changed. In addition, resource pools of levels of respective classes may be configured to overlap in some or all time/frequency resources so as to prevent excessive resource fragmentation.

When a resource pool to be used according to a class of a D2D signal is divided as described above, it may be necessary to appropriately adjust load every resource pool configured for each class. To this end, the amount of time and frequency resource to be used in transmission of a single D2D signal may be separately adjusted according to a class. In particular, in the case of time resource, the same D2D data is repeatedly transmitted several times for more stable transmission and, thus, the amount of time resource may include a number of times that the same D2D data is repeatedly transmitted.

For example, a high class of a D2D signal, to be stably transmitted via emergency communication, is permitted to use much time and frequency resource in one time transmission, whereas a low class of a D2D signal may be determined to use a smaller amount of resources. In this case, the eNB may configure maximum limits of time and frequency resources to be used by a single D2D signal for each class. According to a similar principle, transmission power to be used in each class of a resource pool or various parameters for determination of the transmission power may also be separately configured so as to maintain coverage of appropriate D2D signal transmission for each class.

As another example, references for using resource pool k may be differently configured for each class while different classes of D2D signals share the same K resource pools and, thus, it may be possible to effectively share the same resource according to respective situations by different classes of signals. For example, different classes of signals may share the same resource according to load.

For example, as illustrated in FIG. 9, when three pools are configured and two classes of a D2D signal are defined, a reference of D2D traffic load with respect to a lower class of D2D signal class 1 may be configured to $th_{load\_n}$, 1 with respect to pool n, a reference of D2D traffic load with respect to a higher class of D2D signal class 2 may be configured to $th_{load\_n}$, 2 with respect to pool n, and $th_{load\_n,1} > th_{load\_n,2}$ may be satisfied. In this case, when it is possible to share the same pool by different classes of D2D signals but the condition may be limited such that higher load is generated in the case of a low class and, thus, when similar load is applied, a high class of signal may be configured to preferentially use a high class of pool.

Specifically, a traffic load reference may be configured without any restriction with respect to a specific class of a D2D signal in a predetermined pool such that a corresponding class of a D2D signal is not permitted to use a corresponding pool. In addition, when load is measured by a UE that transmits each class of a signal in order to measure whether the load satisfies a corresponding class of a load reference, a D2D signal of a class that is equal to or lower than a class to be transmitted by the UE is included in a measurement load and a higher class of a D2D signal may not be included in the measurement load even if being observed. This may reduce the possibility of transmission of a relatively low class of signal by excluding generation of load due to a higher class of a signal.

In order to smoothen this operation, a reference signal of a sequence used according to a D2D signal class may be differently configured and a UE may operate to measure D2D load of a corresponding pool in the form of measuring transmission power with respect to only a sequence used by a signal, a class of which is equal to or less than a signal class transmitted by the UE. The description applied to the case in which a resource pool is determined based on the load described with regard to Embodiments 2 to 5 above may also be commonly applied to Embodiment 6 above.

Figure 10:
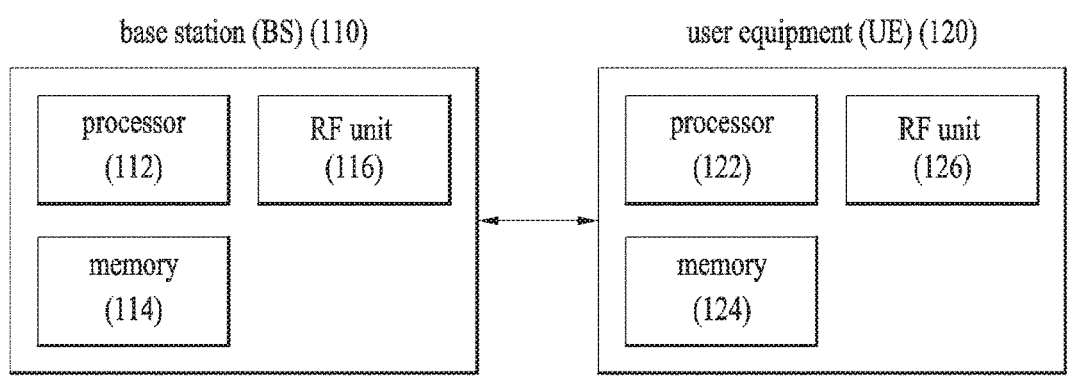
FIG. 10 is a block diagram of a communication device applicable to an embodiment of the present invention.

FIG. 10 illustrates a BS and a UE applicable to an embodiment of the present invention. In a system including a relay, the BS and the UE may be replaced with the relay.

Referring to FIG. 10, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas. The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

Figure 11:
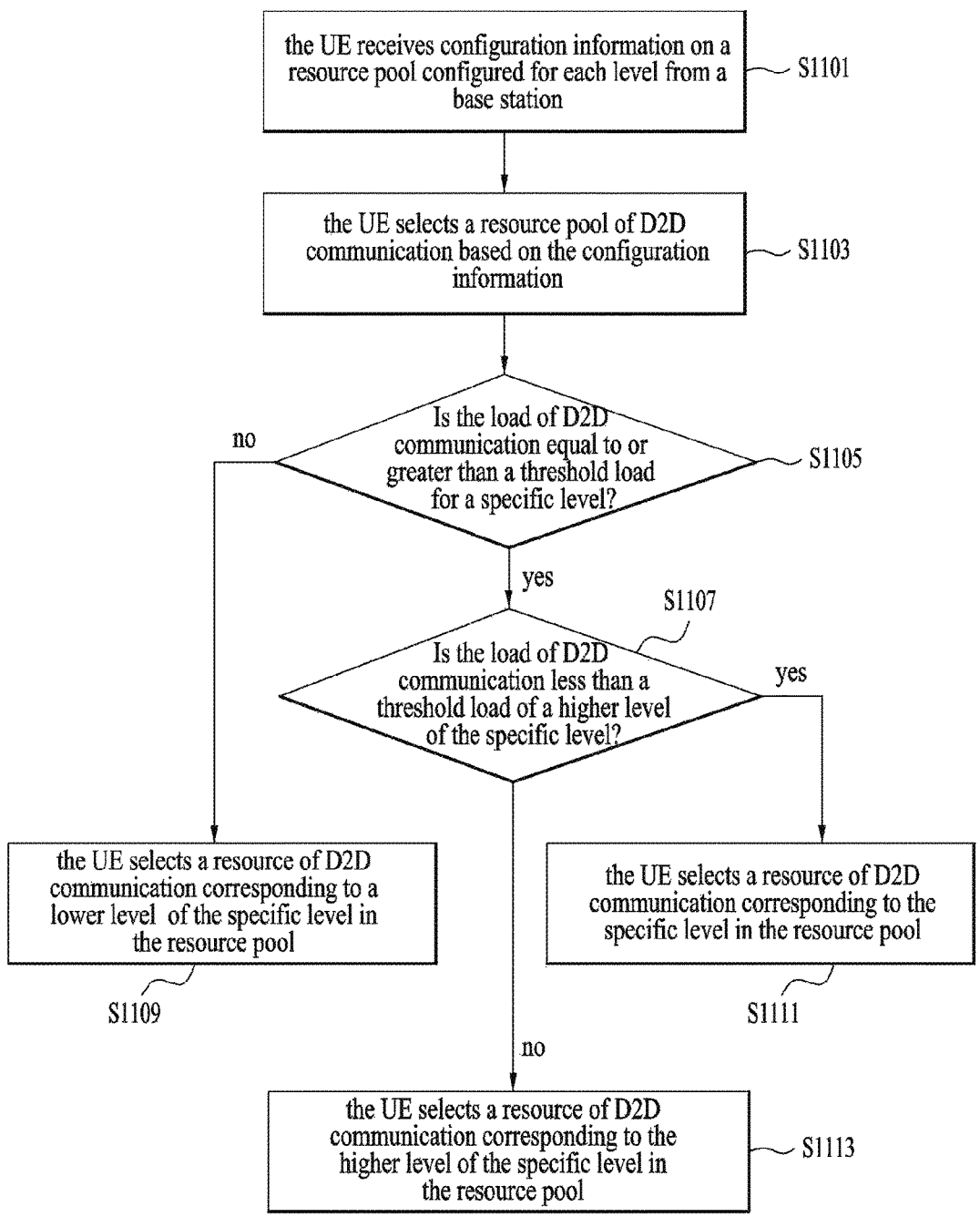
FIG. 11 is a flow diagram of a method of determining a resource for device-to-device (D2D) communication according to an embodiment of the present invention.

FIG. 11 is a flow diagram of a method of determining a resource for device-to-device (D2D) communication according to an embodiment of the present invention. In step of S1101 of FIG. 11, the UE receives configuration information on a resource pool configured for each level from a base station. In step of S1103 of FIG. 11, the UE selects a resource pool of D2D communication based on the configuration information. In the step of S1105 of FIG. 11, if the load of D2D communication is not equal to or greater than a threshold load for a specific level, then in the step of S1109 of FIG. 11, the UE selects a resource of D2D communication corresponding to a lower level of the specific level in the resource pool. In the step of S1105 and S1107 of FIG. 11, if the load of D2D communication is equal to or greater than a threshold load for a specific level, and the load of D2D communication is less than a threshold load of a higher level of the specific level, then in the step of S1111 of FIG. 11, the UE selects a resource of D2D communication corresponding to the specific level in the resource pool. In the step of S1105 and S1107 of FIG. 11, if the load of D2D communication is equal to or greater than a threshold load for a specific level, and the load of D2D communication is not less than a threshold load of a higher level of the specific level, then in the step of S1113 of FIG. 11, the UE selects a resource of D2D communication corresponding to the higher level of the specific level in the resource pool.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although an example in which a method and apparatus for transmitting and receiving a synchronization signal for device-to-device (D2D) communication in a wireless communication system is applied to a 3GPP LTE system is described, the present invention is applicable to various wireless communication systems in addition to a 3rd generation partnership project long term evolution (3GPP LTE) system.

The invention claimed is:

1. A method of determining a resource for device-to-device (D2D) communication in a wireless communication system, the method comprising:
receiving, from a base station (BS), configuration information on a resource pool configured for each level;
selecting a resource pool of D2D communication based on the configuration information;
selecting a resource in the resource pool based on a level to be used in the D2D communication determined by using a load of D2D communication,
wherein the resource pool is configured in at least two levels, and
wherein, when the load f D2D communication is equal to or greater than a threshold load for a specific level and is less than a threshold load of a higher level of the specific level, the specific level is determined as the level; and
transmitting a signal to a counterpart user equipment (UE) of the D2D communication using the selected resource.

2. The method according to claim 1, wherein the level to be used in the D2D communication is further determined based on an importance of a signal of the D2D communication.

3. The method according to claim 1, wherein, when the level is determined as n+1, the selected resource pool comprises a resource pool for the level (n+1), where n is a positive integer.

4. The method according to claim 3, wherein the selected resource pool comprises a resource pool for level n.

5. The method according to claim 1, wherein:
the configuration information indicates a resource for each level; and
a resource for each level is a resource added from a resource for a low level.

6. The method according to claim 1, wherein the selecting of the resource pool is performed at a predetermined period.

7. The method according to claim 1, further comprising:
transmitting information on the determined level to a BS by the UE.

8. The method according to claim 7, further comprising:
receiving scheduling information based on information on the determined level.

9. The method according to claim 8, wherein a resource corresponding to a remaining resource pool except for a resource pool of a selected level from the resource pool configured for each level is allocated for a signal with the BS.

10. A user equipment (UE) for performing a method determining a resource for device-to-device (D2D) communication in a wireless communication system, the UE comprising:
a transceiver for transmitting and receiving a signal to and from a base station (BS) or a counterpart UE of D2D communication; and
a processor for processing the signal,
wherein the processor is configured to:
receive, from a base station (BS), configuration information on a resource pool configured for each level
select a resource pool of D2D communication based on the configuration information, and
select a resource of D2D communication in the resource pool based on a level of to be used in the D2D communication determined by using a load of D2D communication,
wherein the resource pool is configured in at least two levels,
wherein, when the load of D2D communication is equal to or greater than a threshold load for a specific level and is less than a threshold load of a higher level of the specific level, the specific level is determined as the level, and
transmit a signal to a counterpart user equipment (UE) of the D2D communication using the selected resource.

* * * * *